US005903465A

United States Patent [19]

Brown

[11] Patent Number: 5,903,465

[45] Date of Patent: May 11, 1999

[54] METHOD AND APPARATUS FOR CUSTOMIZING COSMETIC PRODUCTS

[75] Inventor: Richard William Brown, Wellingborough, United Kingdom

[73] Assignee: Elizabeth Arden Company, New York, N.Y.

[21] Appl. No.: 08/110,273

[22] Filed: Aug. 23, 1993

[51] Int. Cl.[6] ........ G06F 17/00

[52] U.S. Cl. ........ 364/479.12

[58] Field of Search ........ 364/479, 479.12; 366/108, 117, 118

[56] References Cited

U.S. PATENT DOCUMENTS

| | | | |
|---|---|---|---|
| 4,628,974 | 12/1986 | Meyer | 364/479 |
| 4,705,083 | 11/1987 | Rossetti | 366/161 |
| 4,766,548 | 8/1988 | Cedrone et al. | 364/479 |
| 4,835,701 | 5/1989 | Ohiwa et al. | 364/477 |
| 4,871,262 | 10/1989 | Krauss et al. | 366/160 |
| 4,909,632 | 3/1990 | McFarlane | 356/402 |
| 4,911,544 | 3/1990 | Walsh | 350/600 |
| 4,967,938 | 11/1990 | Hellenberg | 222/144 |
| 5,006,995 | 4/1991 | Toschi et al. | 364/468 |
| 5,078,302 | 1/1992 | Hellenberg | 222/444 |
| 5,163,010 | 11/1992 | Klein et al. | 364/479 |

FOREIGN PATENT DOCUMENTS

| | | |
|---|---|---|
| 0 094 218 | 11/1983 | European Pat. Off. . |
| 0 443 741 | 8/1991 | European Pat. Off. . |
| 41 10 299 | 2/1993 | Germany . |

OTHER PUBLICATIONS

Article Entitled "Anti–Wrinkle Revolution", Self Magazine, Nov. 1992, p. 132.

Advertisement for Clinique Appearing in the New York Times Magazine, Oct. 25, 1992, p. 21.

*Primary Examiner*—Paul P. Gordon
*Attorney, Agent, or Firm*—Milton L. Honig

[57] ABSTRACT

A machine is provided for customizing a cosmetic product at point of sale to a customer. The dispensing machine of the invention includes a mechanism for receiving operating instructions about a customer's optimal formula; a series of dispensers each containing a different cosmetic composition; a mechanism for activating dosing to a common dosing chamber of certain of the cosmetic compositions and at certain concentrations as determined by the operating instructions; and a mechanism for delivering the dosed formula into a container to the customer as a cosmetic product. Other advantageous features include a temperature regulation system, dual pumps of different capacity for obtaining highly accurate dosing, a bar code labeling system, and a telemodem for remote reporting of machine failure, empty dispensers and customer information.

23 Claims, 2 Drawing Sheets

METHOD AND APPARATUS FOR CUSTOMIZING COSMETIC PRODUCTS

BACKGROUND OF THE INVENTION

1. Field of the Invention

The invention concerns a machine for customizing a cosmetic product at the point of sale to a customer.

2. The Related Art

Selection of the optimal color shade is often a customer's chief concern in purchasing a cosmetic facial product. A number of companies in the industry have sought to render easier the selection process. Clinique and Clarion have installed computers at sales counters for use by the customer. Information on color shade, oiliness and other properties of a customer's skin are punched into the computer which then determines the company's most closely matching product.

Another point of sale technique has been that of custom blending. Two major companies, Prescriptives (division of Estee Lauder) and Visage (division of Revlon) begin a sale by manually evaluating a subject's skin color. The salesperson then adjusts existing finished foundations so as to match the evaluated skin color. Unfortunately, there are many disadvantages in manual blending. The most obvious of these is that too much time is required for a match, sometimes 30–45 minutes. On many occasions there is a poor skin match, reproducibility is poor and extensive training is required of the salesperson.

Accordingly, it is an object of the present invention to provide an apparatus that can custom blend ingredients for delivery of a cosmetic product in a reduced period of time.

Another object of the present invention is to provide a custom blending machine for ingredients to obtain a cosmetic product that matches skin properties with a particular optimum reproducible formula.

A further object of the present invention is to provide a custom blending machine for ingredients to form a cosmetic product wherein the machine is suitable for placement in a department store and can readily be operated by a salesperson.

A still further object of the present invention is to provide a custom blending machine for ingredients to obtain a cosmetic product that is highly accurate in dispensing each of the ingredients.

These and other objects of the present invention will become more readily apparent through consideration of the following summary, drawing and detailed description which follow.

SUMMARY OF THE INVENTION

A machine for custom blending of a color cosmetic product is provided that includes:

(i) a mechanism for receiving operating instructions about a customer's optimal formula;

(ii) a plurality of dispensers each containing a cosmetic composition of a different color;

(iii) a mechanism for activating dosing to a common dosing chamber of certain selected ones of the cosmetic compositions and at certain concentrations as determined by the operating instructions; and (iv) a mechanism for delivering the dosed formula into a container to the customer as a color cosmetic product.

Advantageously, the machine may also include a mechanism for regulating temperature. Suitable for such purpose is a combination of at least one heater and at least one fan. Best results are achieved when temperature is controlled between 20 and 27° C., preferably between 22 and 24° C.

The plurality of dispensers are preferably at least five in number. There should be a separate dispenser for each of a set of monochromatic colored cosmetic compositions which respectively are yellow, red and black colored compositions. The fourth and fifth dispenser preferably contain identical compositions, each of which are white colored. Additionally, there may be a sixth dispenser that will contain a talc composition. A further dispenser may include an additive such as a sunscreen, a moisturizer, an oil absorbent organic polymer or combinations of these additives. Suitable sunscreens include titanium dioxide, oxybenzone, Parsol 1789® and ethylhexyl p-methoxycinnamate, as well as combinations thereof. Moisturizers may be selected from propylene glycol, polyethylene glycol, glycerin, water, mineral oil and combinations thereof. Oil absorbent organic polymers are represented by acrylic polymers and PVP-Eicosene copolymers.

A series of pumps are necessary as a component of the mechanism for delivery of the dosed formula. These pumps assist in transporting the different cosmetic compositions from the dispenser to the common dosing chamber leading into a container for holding the customer's finished cosmetic product. Each dispenser will be associated with at least one pump. Advantageously, the first and second of the white-colored composition-containing dispensers will each be associated with a pump of a different pumping capacity. One of these pumps will have a capacity ranging from about 0.01 to about 0.2 g/stroke while the second pump will have a capacity ranging from greater than 0.2 to 0.5 g/stroke. The smaller of the pumps is present to increase resolution and prevent a dosing error in the color shades. The larger of the pumps speeds delivery of the dosed formula because white is normally the largest component of the color mix.

The machine can also include an agitator for receiving the container when full with the dosed formula and for vibrating the container to achieve uniform dispersion of all dosed cosmetic compositions. A preferred agitator is a unit powered by a motor whose shaft is fixed to a counterbalance weight torque arm. A cam is attached to the arm; atop the cam is a cradle for receiving the formula dosed container. Vibration is best performed at 3,000 to 4,000 rpm.

Advantageously, there will also be present a mechanism within the machine for diagnosing and reporting any failure to deliver proper amounts of the dosed cosmetic compositions to the container. Among the types of failures diagnosed would be those resulting from a problem with insufficient cosmetic composition being within any one of the dispensers, an electrical circuit malfunction or even a pump malfunction. A telemodem may be incorporated within the machine for transmitting the aforementioned diagnosis and report via a telephone linkage to a central monitoring station remote from the machine.

As a further feature, the machine may include a labeling mechanism for applying a label to the container identifying the optimal formula dispensed therein. The label can be in the form of a bar code for identifying the particular optimal formula.

BRIEF DESCRIPTION OF THE DRAWING

Features and advantages of the present invention will more fully be appreciated by reference to the drawing in which.

DETAILED DESCRIPTION

Figure 1:
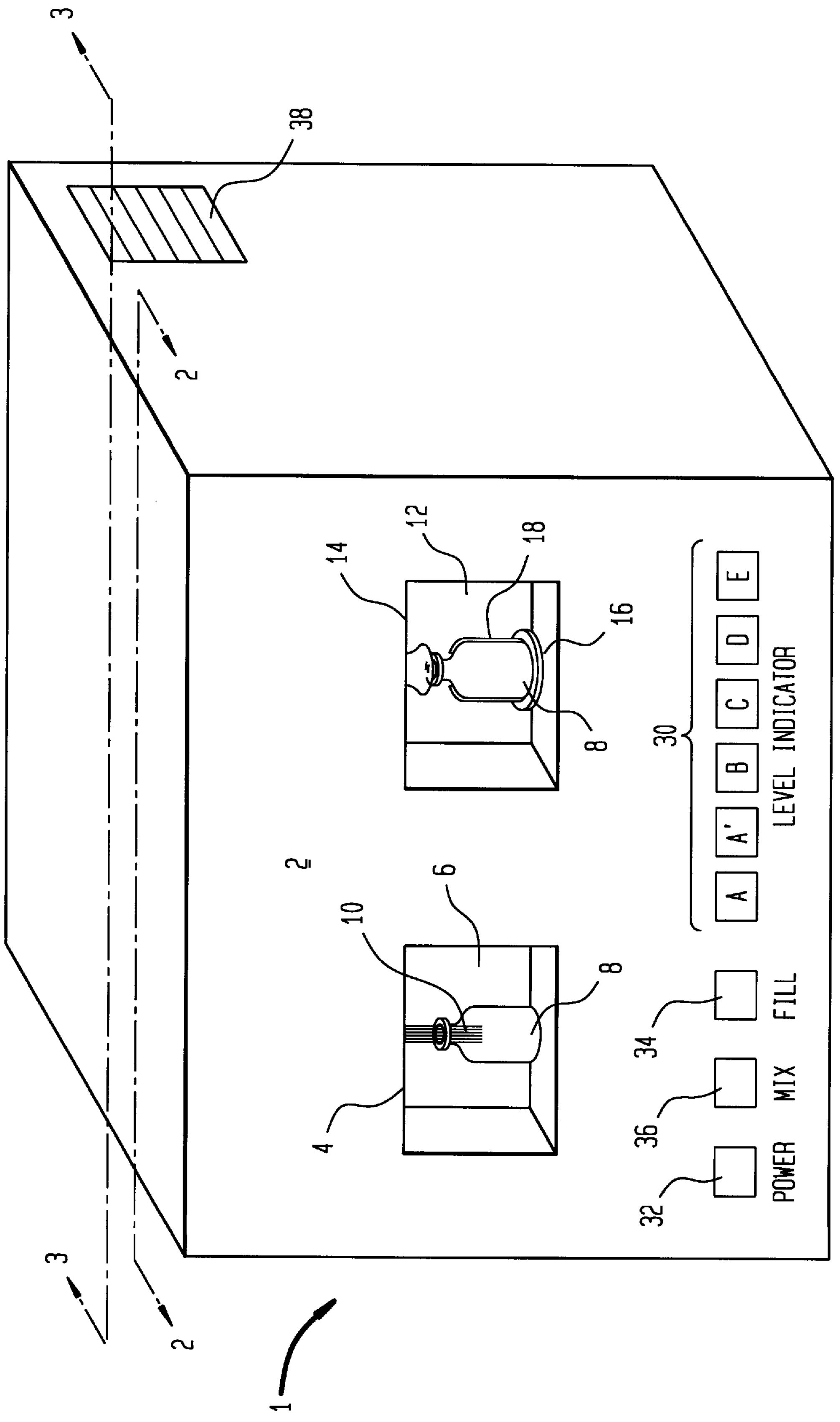
FIG. 1 is a highly schematic perspective view of the machine according to the present invention.

FIG. 1 illustrates the machine 1 of the present invention which is utilized for custom blending of a cosmetic product such as a facial foundation, rouge, nail polish or related color product. The machine on a front wall 2 thereof will have a window 4 allowing access to a dosing chamber 6. An operator can place an empty container 8, usually an empty clear glass bottle, through the window into the dosing chamber 6. Container 8 will be positioned to receive various cosmetic compositions from at least one, usually four or more, nozzles 10.

Upon completion of fill into container 8, the filled container is transferred to a blending chamber 12 which is accessed via window 14 within front wall 2 of the machine. Within blending chamber 12 is an agitator 16 that receives the filled container and vibrates the contents to achieve uniform dispersion of all dosed cosmetic compositions.

A further useful aspect of the invention may be incorporation of a labeling device 18 for applying a label to the container thereby identifying the specific dosed formula. The label may be in the form of a bar code.

Dosing chamber 6 and blending chamber 12 need not be separate spacial areas. For the highest efficiency, it may be desirable to combine the dosing and blending operation within a single chamber. Under such arrangement, the agitator 16 will be positioned directly underneath the nozzles 10.

Figure 2:
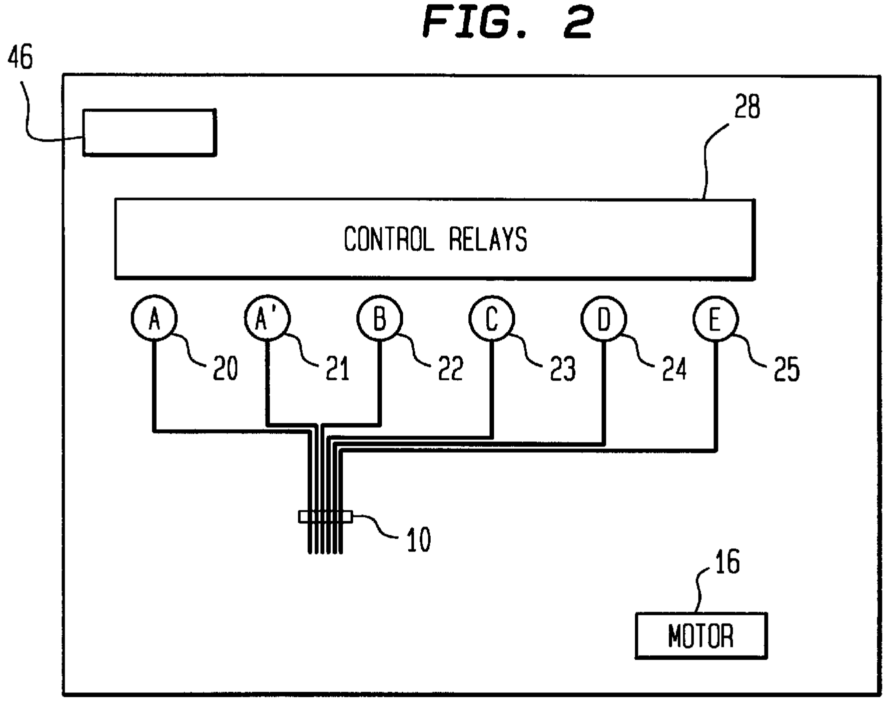
FIG. 2 is a highly schematic cross-sectional plan view of the machine taken along line 2—2 of FIG. 1.

FIG. 2 illustrates a cut-away front segment of machine 1. A series of fixed pumps 20–25 are supported in an upper area of the machine. Each of the pumps are fluidly connected to a series of six respective reservoirs identified as dispensers 20'–25'. Reservoir 20' and 21' each hold identical white-colored cosmetic chemical composition A and A'. Dispensers 22', 23' and 24' each respectively contain a yellow, a red and a black-colored cosmetic composition identified as B, C and D. Each reservoir is fluidly connected to each respective pump.

Pump 20 has a different pumping capacity than pump 21, each of which pumps are employed to transfer an identical white-colored cosmetic composition. More particularly, the smaller pump 20 has a pumping capacity ranging from about 0.01 to 0.2 g/stroke, preferably from about 0.05 to 0.15 g/stroke. The larger pump 21 has a pumping capacity greater than about 0.2 to 0.5 g/stroke, preferably between 0.25 to 0.35 g/stroke.

A programmable logic controller 26 is positioned within machine 1 to receive operating instructions concerning the optimal formula to be dispensed. These operating instructions can be delivered electronically via a device that measures a customer's specific skin requirements or via mechanical input from a human expert assigning an optimal formula. The programmable logic controller 26 is electronically connected to a series of control relays 28 that activate movement of pumps 20–25.

Besides the colored cosmetic compositions, there also is a talc composition E held within dispenser 25' comprising talc and a fluid carrier. Composition E is utilized as a facial coverage modifier and finish adjuster, i.e. matte or dewy finish, for foundation cosmetic products.

Particularly suitable as pumps are the ProMinent Gamma/4 pumps available from Dosiertechnik GmbH.

Each of the dispensers 20'–25' has an associated liquid level monitor/switch device 20"–25" to identify the amount of cosmetic composition still remaining in the reservoir of the respective dispensers. Level indicator lights 30 connect to respective liquid level switches 20"–25". These level indicator lights 30 are arranged along front wall 2 of machine 1. Additionally, machine 1 will include a power switch 32 for electrically energizing the machine, a fill switch 34 for energizing the dosing mechanism and a mixer switch for initiating rotation of spinner 16.

Figure 3:
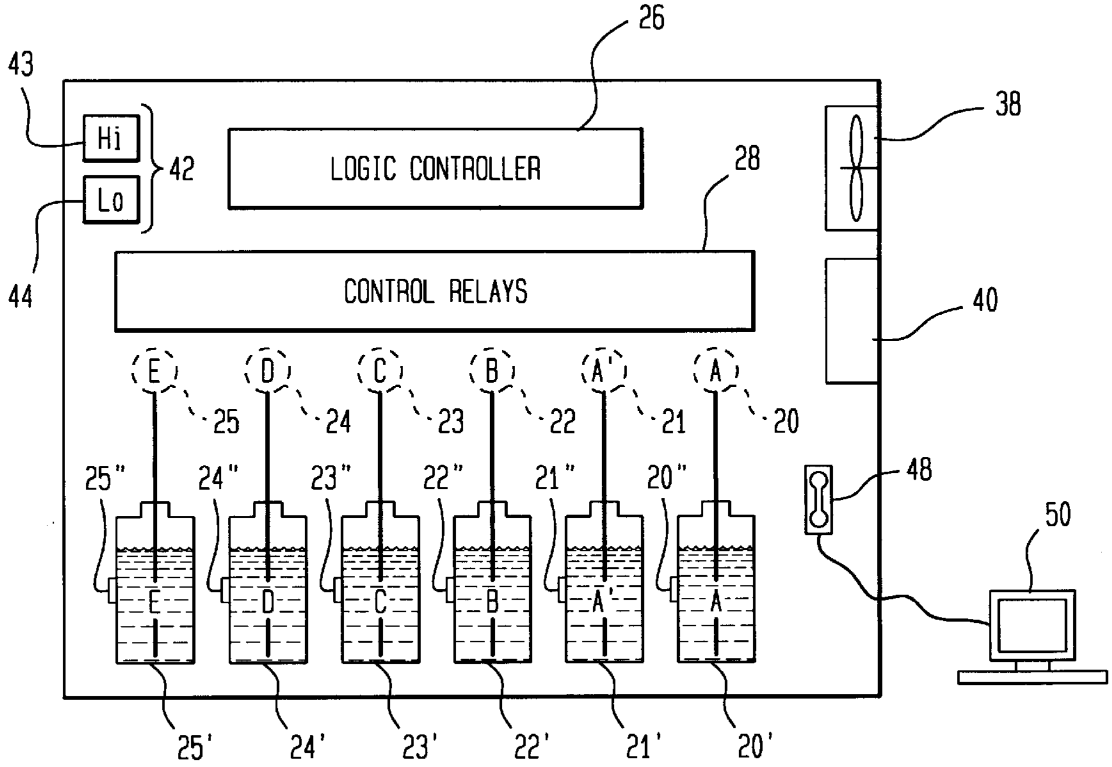
FIG. 3 is a highly schematic cross-sectional view of the machine taken along line 3—3 of FIG. 1.

FIG. 3 best illustrates the temperature regulating system within the machine 1. This system consists of a cooling fan 38 and heater 40 which are regulated by a temperature controller 42 having a high and low controlling mechanism, respectively 43 and 44. Temperature must be maintained between 20 and 27° C., preferably between 22 and 24° C., to maintain uniform viscosity of the liquid cosmetic compositions; changes in viscosity would bring about different dosing speeds thereby altering the accuracy of the dosed formula.

Within the housing of machine 1 is a mechanism 46 for diagnosing and reporting any failure to deliver proper amounts of the dosed compositions to the container. A telemodem 48 is also present within the housing for transmitting a failure diagnosis report generated by mechanism 46 via telephone linkage to a central monitoring station remote 50 remote from machine 1. A further function of telemodem 48 is transmission of data concerning cosmetic composition usage, customer identification with a respective optimal formula and related data.

The foregoing description illustrates selected embodiments of the present invention and in light thereof variations and modifications will be suggested to one skilled in the art, all of which are within the spirit and purview of this invention.

What is claimed is:

1. A machine for custom blending of a color cosmetic product comprising:

(i) a means for receiving operating instructions about a customer's optimal formula;

(ii) a plurality of dispensers each containing a cosmetic composition of a different color selected from the group consisting of white, yellow, red and black;

(iii) a means for activating dosing to a common dosing chamber of certain selected ones of the cosmetic compositions and at certain concentrations as determined by the operating instructions; and (iv) a means for delivering the dosed formula into a container to the customer as a color cosmetic product.

2. The machine according to claim 1 further comprising a means for regulating temperature within said machine.

3. The machine according to claim 2 wherein said means for regulating temperature controls said temperature between 20 and 27° C.

4. The machine according to claim 3 wherein said temperature is controlled between 22 and 24° C.

5. The machine according to claim 2 wherein said means for regulating temperature comprises a combination of at least one heater and at least one fan.

6. The machine according to claim 1 wherein said plurality of dispensers are at least five in number.

7. The machine according to claim 6 wherein four of said dispensers contain a cosmetic composition which has a monochromatic color being respectively a white, yellow, red and a black color.

8. The machine according to claim 7 wherein a fifth dispenser contains a cosmetic composition that is identical to the white-colored cosmetic composition.

9. The machine according to claim 8 wherein the means for delivery of the dosed formula includes a plurality of pumps, each pump being associated with one of said five dispensers to deliver a respective cosmetic composition into said container.

10. The machine according to claim 9 wherein a first and a second of said dispensers for said white-colored cosmetic compositions is associated each with a pump of a different pumping capacity.

11. The machine according to claim 10 wherein said first dispenser of said white-colored cosmetic composition has a pump with a pumping capacity ranging from 0.01 to 0.2 g/stroke and said second dispenser of said white-colored cosmetic composition has a pump with a pumping capacity ranging from greater than 0.2 to 0.5 g/stroke.

12. The machine according to claim 8 wherein a sixth of said plurality of dispensers contains a cosmetic composition containing talc.

13. The machine according to claim 1 comprising at least one further dispenser for a cosmetic composition that comprises an additive selected from the group consisting of a sunscreen composition, a moisturizer, an oil absorbent organic polymer and combinations thereof.

14. The machine according to claim 1 further comprising an agitator for receiving said container when full with said dosed formula and for vibrating said container to achieve uniform dispersion of all dosed chemical compositions.

15. The machine according to claim 1 further comprising a means for diagnosing and reporting any failure to deliver proper amounts of dosed cosmetic composition to said container.

16. The machine according to claim 15 wherein said failure is a result of a problem selected from the group consisting of insufficient amount of cosmetic composition within a dispenser, an electrical circuit malfunction and a pump malfunction.

17. The machine according to claim 15 further comprising a telemodem for transmitting said diagnosis and reporting same via telephone linkage to a central monitoring station remote from said machine.

18. The machine according to claim 1 further comprising a labeling means for applying a label to said container identifying the optimal formula dispensed therein.

19. The machine according to claim 18 wherein said label includes a bar code for said optimal formula.

20. The machine according to claim 1 wherein the means for delivering the dosed formula includes a first and second pump of different pumping capacity.

21. A machine for custom blending of a cosmetic product comprising:

(i) a means for receiving operating instructions about a customer's optimal formula;

(ii) a plurality of dispensers each containing a cosmetic composition;

(iii) a means for activating dosing to a common dosing chamber of certain selected ones of the cosmetic compositions and at certain concentrations as determined by the operating instructions;

(iv) a means for delivering the dosed formula into a container to the customer as a cosmetic product; and (v) a means for regulating temperature within said machine to maintain said cosmetic compositions at a constant viscosity thereby improving accuracy of dosing.

22. The machine according to claim 21 wherein the means for regulating temperature comprises a combination of at least one heater and at least one fan.

23. A machine for custom blending of a cosmetic product comprising:

(i) a means for receiving operating instructions about a customer's optimal formula;

(ii) a plurality of dispensers each containing a cosmetic composition;

(iii) a means for activating dosing to a common dosing chamber of certain selected ones of the cosmetic compositions and at certain concentrations as determined by the operating instructions; and (iv) a means for delivering the dosed formula into a container to the customer as a cosmetic product, said delivery means including a first and second pump of different pumping capacity.

* * * * *

UNITED STATES PATENT AND TRADEMARK OFFICE

CERTIFICATE OF CORRECTION

PATENT NO. : 5,903,465

DATED : May 11, 1999

INVENTOR(S) : Brown

It is certified that error appears in the above-indentified patent and that said Letters Patent is hereby corrected as shown below:

On the title page: Item [73] "Elizabeth Arden Company,"

to -- Elizabeth Arden Company, Division of Conopco, Inc. --

Signed and Sealed this

Seventh Day of November, 2000

Attest:

Q. TODD DICKINSON

*Attesting Officer*

*Director of Patents and Trademarks*